(12) United States Patent
Swander et al.

(10) Patent No.: US 7,346,770 B2
(45) Date of Patent: Mar. 18, 2008

(54) METHOD AND APPARATUS FOR TRAVERSING A TRANSLATION DEVICE WITH A SECURITY PROTOCOL

(75) Inventors: Brian D. Swander, Bellevue, WA (US); William H. Dixon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 706 days.

(21) Appl. No.: 10/284,931

(22) Filed: Oct. 31, 2002

(65) Prior Publication Data

US 2004/0088537 A1 May 6, 2004

(51) Int. Cl.
*H04L 9/00* (2006.01)

(52) U.S. Cl. ............... 713/153; 713/171; 709/201; 726/14

(58) Field of Classification Search ......... 713/171; 726/14–15
See application file for complete search history.

(56) References Cited

U.S. PATENT DOCUMENTS

| | | | |
|---|---|---|---|
| 6,822,957 B1* | 11/2004 | Schuster et al. ........... 370/389 |
| 6,886,103 B1* | 4/2005 | Brustoloni et al. ......... 726/15 |
| 6,957,346 B1* | 10/2005 | Kivinen et al. ............ 713/153 |
| 6,957,946 B1* | 10/2005 | Vander Kley .............. 415/4.2 |
| 6,996,842 B2* | 2/2006 | Strahm et al. .............. 726/13 |
| 7,032,242 B1* | 4/2006 | Grabelsky et al. .......... 726/11 |
| 7,143,137 B2* | 11/2006 | Maufer et al. ............. 709/205 |
| 7,143,188 B2* | 11/2006 | Maufer et al. ............. 709/245 |
| 2001/0020273 A1* | 9/2001 | Murakawa ................. 713/201 |
| 2002/0046348 A1* | 4/2002 | Brustoloni ................ 713/201 |
| 2002/0097724 A1* | 7/2002 | Halme et al. .............. 370/392 |
| 2002/0133602 A1* | 9/2002 | Godwin et al. ............ 709/229 |
| 2003/0018813 A1* | 1/2003 | Antes et al. .............. 709/245 |
| 2003/0135616 A1* | 7/2003 | Carrico et al. ............. 709/225 |
| 2003/0145227 A1* | 7/2003 | Boden ...................... 713/201 |

FOREIGN PATENT DOCUMENTS

WO      WO 00/78008 A1    12/2000

OTHER PUBLICATIONS

U.S. Appl. No. 10/337,763, filed Jan. 7, 2003, Swander.

(Continued)

*Primary Examiner*—Ayaz Sheikh
*Assistant Examiner*—Trang Doan
(74) *Attorney, Agent, or Firm*—Wolf, Greenfield & Sacks, P.C.

(57) ABSTRACT

The invention uses a three phase IKE protocol main mode negotiation to implement a port float algorithm that permits UDP encapsulated ESP traffic to traverse an IPSec-aware NAT. The NAT is connected to a plurality of client computers on a private network and provides an interface between the client computers and a server connected to a public network. In a first phase, a client and the server determine whether both are capable of sending UDP encapsulated ESP packets. In a second phase, the client and server conduct NAT discovery and determine whether the client, server, or both operate behind a NAT. In a third phase, the client and server initiate a port float algorithm, moving a destination UDP port specified in IKE packets from a first port value to a second port value. The server maintains a data structure that allows the server to identify the client sending IKE packets after exiting the second phase and entering the third phase.

20 Claims, 4 Drawing Sheets

OTHER PUBLICATIONS

U.S. Appl. No. 10/348,594, filed Jan. 21, 2003, Swander et al.

IP Security Protocol Working Group (IPSEC) Internet Draft, Category: Standards track, Expires: Jun. 2003—UDP Encapsulation of IPsec Packets draft-ietf-ipsec-udp-encaps-05.txt, Dec. 2002, 10 pp.

Network Working Group, Request for Comments: 2406, Obsoletes: 1827, Category: Standards Track—IP Encapsulating Security Payload (ESP), Nov. 1998, 20 pp.

IPSec Working Group, Internet-Draft, Category: Informational, <draft-ietf-ipsec-nat-reqts-02.txt>, Aug. 18, 2002—IPsec-NAT Compatibility Requirements, 15 pp.

ipSEC Express—SSH IPSEC Express, White Paper, Version 2.0, Mar. 1999, 23 pp.

Network Working Group, Request for Comments: 2401, Obsoletes: 1825, Category: Standards Track—Security Architecture for the Internet Protocol, 58 pp.

IPSEC Working Group, Internet-Draft, draft-ieft-ipsec-ike-01.txt: The Internet Key Exchange (IKE), <draft-ietf-ipsec-ike-01.txt>, 36 pp.

Network Working Group, Request for Comments: 2663, Category: Informational, IP Network Address Translator (NAT) Terminology and Considerations, Aug. 1999, 27 pp.

\* cited by examiner

METHOD AND APPARATUS FOR TRAVERSING A TRANSLATION DEVICE WITH A SECURITY PROTOCOL

TECHNICAL FIELD

This invention relates generally to security protocols and, more particularly, relates to a method and system that allow IPSec packets to traverse a network translation device (NAT).

BACKGROUND OF THE INVENTION

Computer users have become increasingly dependent on communications over public networks, such as the Internet, for both business and personal reasons. Such communications routinely include personal or confidential data. For example, a user may provide credit card or other account information over the public network to purchase goods or services. Sensitive and confidential business communications, emails, and documents are also transmitted over public networks.

Data is transmitted over the Internet and other networks using the Internet Protocol (IP). Unfortunately, IP provides little or no security. Data within standard IP packets is usually not encrypted and may be accessed, viewed and even altered by an eavesdropper. Thus, IP does not protect the confidentiality or authenticity of the data. To address these shortcomings, the Internet Engineering Task Force (IETF) developed a set of extensions to IP referred to as the Internet Protocol Security (IPSec) suite. The IPSec suit includes protocols for authentication header (AH), encapsulating security protocol (ESP), and key management and exchange protocol (IKE).

The ESP protocol, documented mainly in IETF Request for Comments (RFC) 2406, is an authenticating and encrypting protocol that uses cryptographic mechanisms to provide integrity, source authentication, and confidentiality of data. The AH protocol, documented mainly by IETF RFC 2402, is an authentication protocol that uses a hash signature in the packet header to validate the integrity of the packet data and authenticity of the sender. Unlike ESP, AH does not encrypt data within IP packets and, therefore, does not provide for confidentiality.

The IKE protocol, documented mainly in IETF RFC 2409, provides a method for network devices to negotiate security settings used with the AH and ESP IPSec formats. The negotiated security settings form a data structure called a security association (SA). The SA defines parameters such as the authentication algorithm, encryption algorithm, keys, and the lifetime of keys, used by ESP or AH to protect the contents of the IP packet. Because ESP and AH require an established SA, an IKE negotiation is executed before the ESP or AH protocols are used to transmit data.

IPSec packets, i.e. IP packets constructed using the IPSec protocol suite, are incompatible with some network devices. One example of a network device not designed to handle some IPSec packets is a Network Address Translation device (NAT). A NAT is typically connected to a plurality of client computers on a private network as an interface between the private network and a public network. Each client computer has a private source IP address that is valid on the private network but not valid on the public network. When a first client sends an IP packet destined for the public network, the NAT intercepts the packet and replaces the private source IP address with an IP address valid on the public network, such as a public IP address assigned to the NAT. The NAT performs the same process for each client, and in each case uses the same source public IP address. This allows multiple client computers to communicate over the public network with a single source IP address.

The NAT may also change a source port address in a transport layer header, e.g. TCP or UDP header, within the IP packet to ensure that each client sends packets with a unique combination of IP and port addresses over the public network. The unique combination of addresses provides the NAT with a mechanism to route response IP packets sent from devices on the public network to the proper client on the private network. The NAT also modifies checksums in the IP and TCP or UDP headers so that the IP packet remains valid.

The transport layer header in some IPSec packets is encrypted. For example, the ESP protocol encrypts the TCP or UDP header, rendering the port addresses and checksum information in the header opaque to the NAT. The NAT cannot read and modify the TCP or UDP header as necessary, preventing the traversal of such packets through the NAT.

UDP encapsulation provides a partial solution allowing some IPSec packets using the ESP protocol to traverse a NAT. The encrypted portion of the IPSec packet is encapsulated into a UDP packet and provided with an unencrypted UDP header. The UDP packet is in turn placed in a standard IP packet. The NAT can then access and modify the port and checksum information within the unencrypted UDP header thereby permitting the traversal of these IP packets through the NAT.

Another partial solution, which is independent of the UDP encapsulation solution, is provided by the implementation of so called "IPSec-aware" NATs. When the IPSec aware NAT detects IKE packets from a client computer, it expects to see subsequent encrypted ESP protocol packets. Embedded within a non-encrypted portion of each ESP packet is a security parameter index (SPI). The NAT attempts to map the SPI, instead of a port address, to each client computer. Thereafter, the NAT uses the mapped SPI to identify the client computer sending the ESP packet. While not a complete solution, this method allows ESP packets to traverse the NAT under limited circumstances.

The UDP encapsulation method is, however, incompatible with IPSec aware NATs. The unencrypted UDP header in the ESP packets, when UDP encapsulation is supplied, includes the same UDP ports as are used for IKE packets, typically port 500. To distinguish between IKE packets and ESP packets, the UDP encapsulation method reformats the ESP packet to include not only the unencrypted UDP header, but also an 8 byte zero pad located between the UDP header and encrypted data. The zero pad allows a computer receiving the IP packet to distinguish between the IKE and ESP packets.

The foregoing presents at least two problems for an IPSec aware NAT. First, the NAT receives ESP packets over UDP port 500 and interprets the packets as IKE packets. Thus, the NAT never receives packets that it interprets as ESP packets and is unable to map SPI values. Second, IKE packets include an I-Cookie which is a non-zero value assigned by the client computer. The location of the I-Cookie in an IKE packets corresponds with the location of the zero pad in the ESP packet. When the NAT receives the ESP packet it may attempt to read the I-Cookie value but instead reads the zero pad. Zero is an invalid I-Cookie value, possibly causing the NAT to drop the packet.

From the foregoing, it is evident that a solution is needed for implementing the IPSec protocol in network environments using a NAT. In particular, a solution is needed that allows encrypted messages to traverse a NAT regardless of whether or not the NAT is IPSec aware.

SUMMARY OF THE INVENTION

The invention uses an IKE protocol main mode negotiation to implement a port float algorithm that permits UDP encapsulated ESP traffic to traverse a NAT regardless of whether the NAT is IPSec aware. The invention uses the IKE negotiation process to perform three phases.

In a first phase, a client and a server exchange IKE packets using a first set of UDP ports. The IKE packets exchanged during the first phase each include a payload indicating that the respective client and server are capable of sending UDP encapsulated ESP packets.

In a second phase, the client and server conduct NAT discovery. The client and server exchange second IKE packets, again using the first set of ports. The packets include NAT discovery payloads that permit the client and server to determine whether a NAT is modifying IP and port addresses of either the client or server. The NAT discovery phase allows the client and server to determine whether at least one of the client and server operate behind a NAT.

In a third phase, the client and server initiate a port float algorithm, whereby subsequent IKE packets are sent using a second set of UDP ports. The server maintains a data structure that allows the server to identify the client sending the IKE packet over the second set of ports. Thereafter, the client sends UDP encapsulated ESP packets over the second set of ports. If the NAT is IPSec aware, it cannot properly process UDP encapsulated ESP packets sent using the first set of ports. Thus, sending the UDP encapsulated ESP packets using the second set of ports allows the packets to traverse the NAT.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
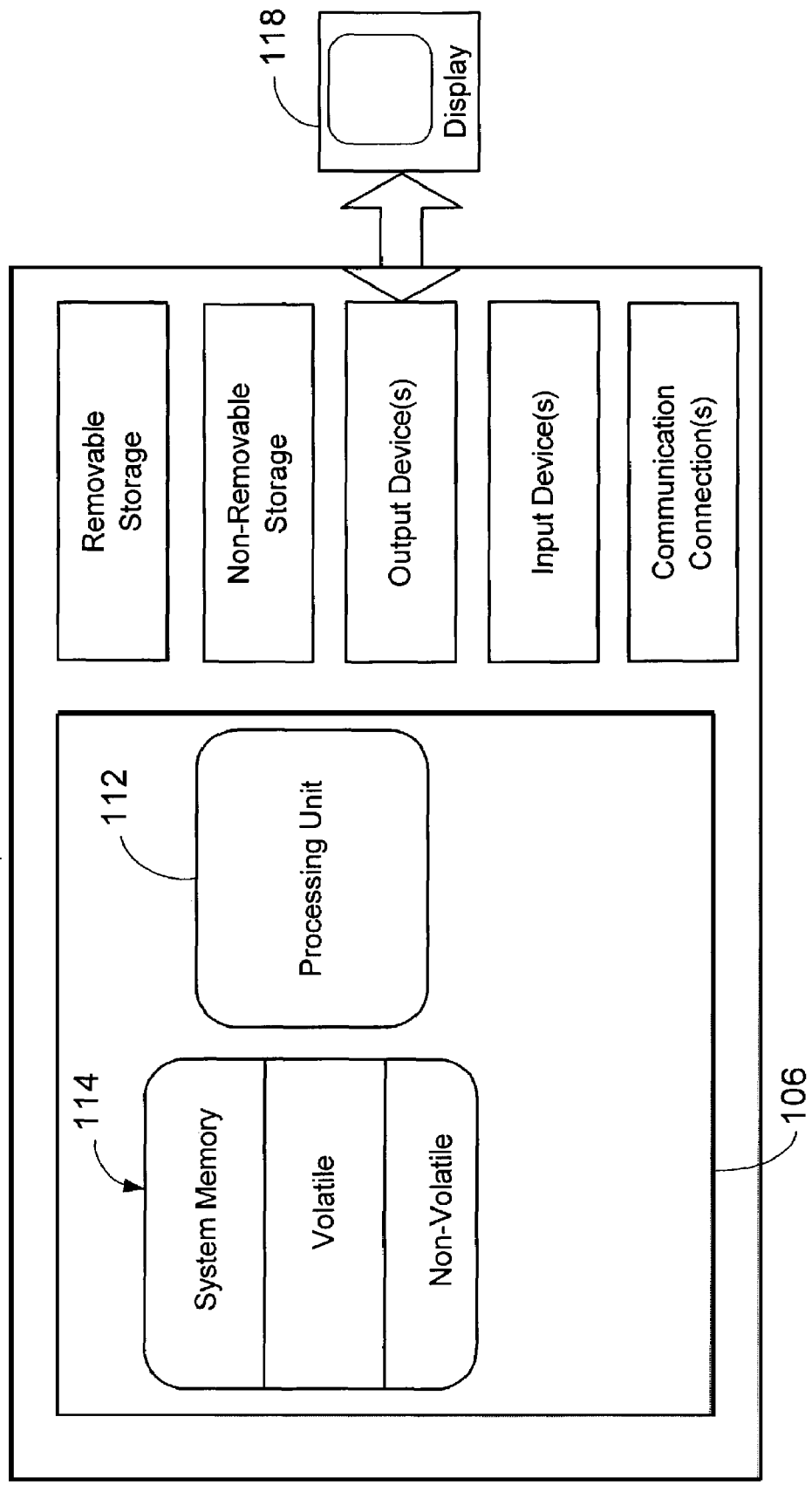
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The present invention may be implemented by programming code modules that are executed by a computer. Generally, program modules include routines, objects, components, data structures and the like that perform particular tasks or implement particular abstract data types. The terms "program" and "module" as used herein may connote a single program module or multiple program modules acting in concert. The invention may be implemented on a variety of types of computers, including personal computers (PCs), telephones, hand-held devices, multi-processor systems, microprocessor-based programmable consumer electronics, network PCs, minicomputers, mainframe computers and the like. The invention may also be employed in thin clients and distributed computing environments, where tasks are performed by remote processing devices that are linked through a communications network. In a distributed computing environment, modules may be located in both local and remote memory storage devices.

Referring to FIG. 1, an example of a basic configuration for a computer 100 on which a network computer in the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 1 by line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

Figure 2:
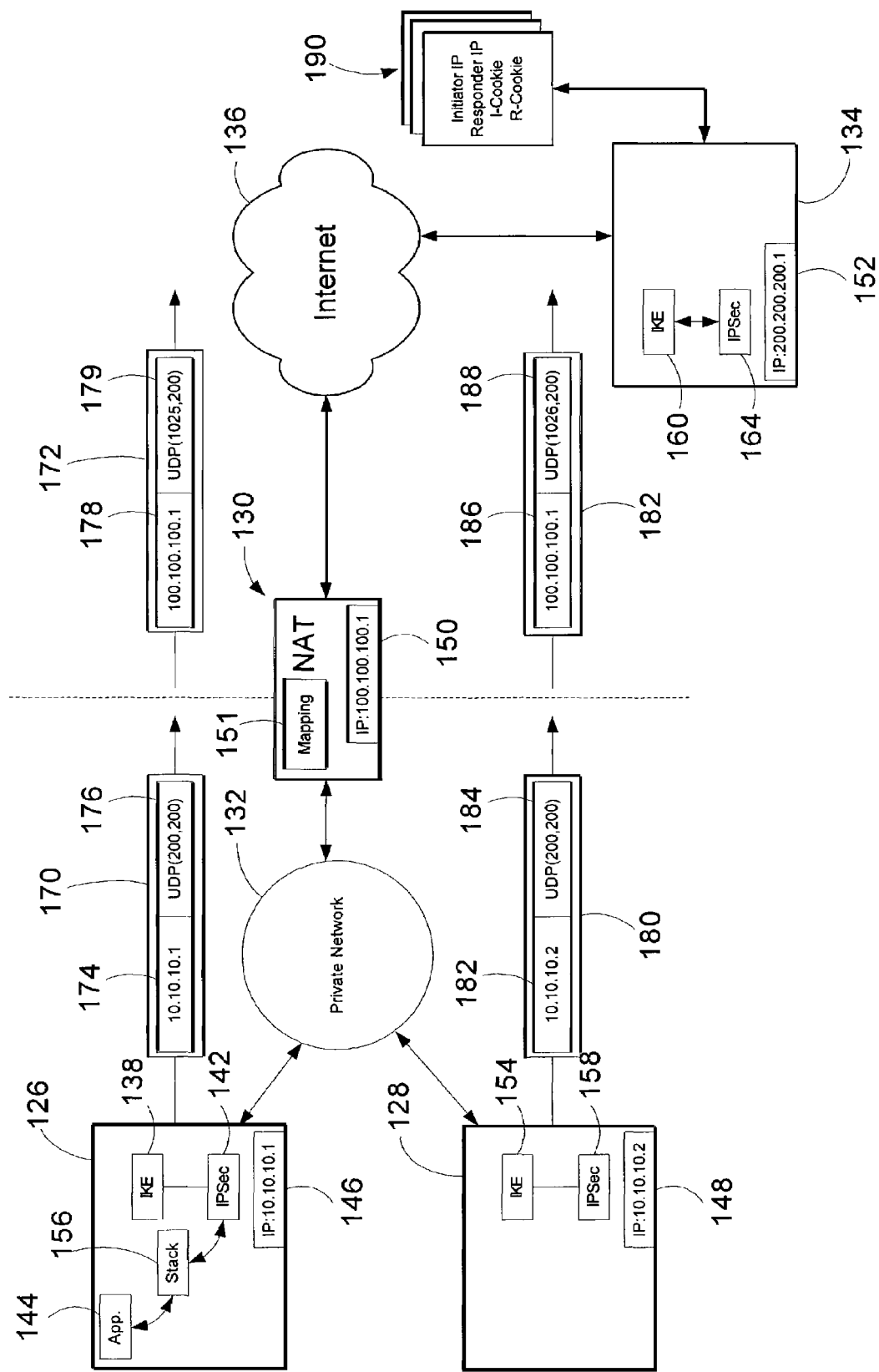
FIG. 2 is a block diagram generally illustrating an exemplary operating environment employing the present invention.

FIG. 2 illustrates an exemplary operating arrangement embodying the present invention. The present invention is directed to a way to handle IPSec packets so that UDP encapsulated ESP packets can traverse a NAT regardless of whether or not the NAT is IPSec-aware. For illustration purposes, the invention will be described below in connection with an embodiment that implements the IPSec protocol suite. It will be appreciated, however, that the system and method can also be used with other network security protocols for solving similar problems.

The arrangement includes a plurality of client computers 126, 128, and a NAT 130 connected to a local network 132. The local network 132 may be any suitable type, such as a Local Area Network (LAN). The environment also includes a public network 136. In the example shown, the public network 136 is the Internet. A server 134 and the NAT 130 communicate over the public network 136. The NAT 130 provides an interface between client computers 126, 128 connected to the local network 132 and the server 134 connected to the public network 136.

The server 134 and each client 126, 128 are implemented as any suitable computing device such as personal computers, handheld devices, printers, switches, routers, bridges, repeaters or the like. The NAT 130 may be a dedicated device or may itself be a client or server. In the example shown, the clients 126 and 128 initiate communication with a computer, such as the server 134. It will by understood by those of skill in the art that the clients 126, 128 may perform a reciprocal function. For example, the server 134 may initiate communication with either client 126 or 128. It will also be understood by those skilled in the art that, although a limited number of devices are shown connected to the local network 132 and the public network 136, each network may be connected to many network devices.

Each client 126, 128 has a private IP address. For example, the private IP address 146 for the client 126 is 10.10.10.1.The private IP addresses form valid source and destination addresses for use in IP packets transmitted within the local network 132. Thus, the client 126 communicates with the client 128 by sending an IP packet with a source IP address of 10.10.10.1 and a destination address of 10.10.10.2.The use of source and destination IP addresses in IP packet headers is well known and need not be described in detail herein. The private IP addresses of clients 126, 128 are not valid, i.e. not assigned, for use as source and destination IP addresses on the public network 136.

The NAT 130 and the server 134 each have a public IP address, labeled 150 and 152 respectively. Unlike the private IP addresses 146, 148 of the client computers, the pubic IP addresses 150, 152 are valid for use as source and destination IP addresses on the public network 136.

The NAT 130 forms an interface between the local network 132 and the public network 136 allowing clients 126, 128 to transmit IP packets to network devices, such as the server 134, connected to the public network 136. When the client 126 sends an IP packet to the server 134, the IP packet includes an IP header with the private source IP address 146 of the client 126, namely, 10.10.10.1 and the destination IP address 152 of the server 134, namely, 200.200.200.1.The NAT 130 receives the IP packet and replaces the private source IP address with the public IP address 150 of the NAT 130, namely, 100.100.100.1.This process, known as address translation, provides the IP packet with a valid source IP address usable over the public network 136.

The NAT 130 also provides address translation for IP packets transmitted from the client 128 to the server 134. The client 128 sends an IP packet with its private IP address 148 of 10.10.10.2 as the source IP address and the server's public IP address 152 of 200.200.200.1 as the destination address. The NAT 130 replaces the source address 148 of the client 128 with its own public IP address 150, which as previously described is 100.100.100.1.Thus, IP packets from both client 126 and client 128 appear as if they are being sent from the same source IP address.

To provide the NAT 130 and the sever 134 with the ability to distinguish between IP packets sent from the client 126 and the client 128, the NAT 130 also performs port translation if necessary. Each IP packet includes a transport layer header such as a UDP or TCP header. The UDP or TCP header includes a source port address and a destination port address. The ports addresses identify a process to which an Internet or other network message is forwarded when it arrives at the client or server. As an example, as described in more detail below, IP packets exchanged during an Internet Key Exchange (IKE) negotiation are usually sent using source and destination ports of 500. As used herein, the term source port refers to a port address of the client 126 or 128. The term destination port refers to a port address of server 134. If two clients 126, 128 send IP packets to the same server 134 using the same source port, the NAT 130 changes one or both of the source port numbers to a new unique source port number thereby providing a unique combination of public IP and port addresses for each of client 126 and 128.

The NAT 130 maintains data 151 that maps the original IP and port addresses, as indicated in the IP packet sent from the client, to the IP and port addresses, as modified by the NAT 130. The server 134 receives IP packets with the public IP address and port address supplied by the NAT 130, not the private IP and port address of the client. Thus, when the server 134 sends a response IP packet to the client, the server 134 uses the port and IP addresses supplied by the NAT. The data 151 allows the NAT 130 to receive the response IP packets from server 134, identify the intended recipient client computer, and return the IP and port addresses to the values used by the client computer. After the IP and port addresses are returned to values used by the client, the packet is transmitted by the NAT and received by the client.

An example of an IP packet sent from the client 126 to the server 134 is illustrated by IP packets labeled 170, 172. For simplicity, only the source IP address and source and destination port addresses for each packet are shown. The nomenclature "UDP(200,200)" represents a UDP protocol layer header that includes source and destination ports of 200. The first number represents the source port and the second number represents the destination port. Those skilled in the art will appreciate that IP packets include additional information such as data lengths, checksums, and payload data.

IP packet 170 illustrates the IP packet as it appears behind the NAT. The source IP address 174 of 10.10.10.1 is the private IP address assigned to the client 126. The source and destination port addresses 176 of the IP packet are 200. IP packet 172 illustrates the IP packet after modification by the NAT 130. The source IP address 178 is changed to the public IP address 150 of the NAT 130. The NAT 130 also changes the source port address from 200 to 1025 as illustrated by UDP header 179.

IP packet 180 represents an IP packet from client 128 to sever 134 as it appears behind the NAT 130. The NAT 130 changes the source IP address to its own public IP address 150 and changes the source port address to a distinct value from that of client 126, for example to source port 1026 as shown by IP packet 182. As previously described, the NAT 130 maintains a mapping 151, such as a table or other data structure, that includes the original source and destination IP and port addresses and the modified source and destination IP and port addresses for each client 126, 128. When the NAT 130 receives response IP packets from the server 134 to one of the clients 126, 128, the NAT determines which client to route the packet to based on the information in the mapping 151.

The clients 126 and 128 also send data to the server 134 using the IPSec protocol. To facilitate the use of the IPSec protocol, client 126 has an IKE process 138, and IPSec process 142. Client 128 also has IKE process 154 and IPSec process 158 and server 134 has IKE process 160 and IPSec process 164. The IPSec process and IKE process are implemented within an operating system executing in each client 126, 128 and server 134. In the exemplary operating arrangement shown in FIG. 1, the IPSec processes 142, 158, 164, are implemented as IPSec drivers. However, it will be understood that the IPSec processes can be implemented in any suitable manner.

An application or other service 144 executing within the client 126 sends data destined for server 134 to a stack 156. The stack 156 is part of transport layer such a TCP or UDP layer. The data is placed in one or more TCP or UDP packets and forwarded to IPSec driver 142. The IPSec driver 142 determines, based on an IPSec policy, whether the data requires encryption or authentication. The IPSec policy is maintained in a security policy database (SPD) which for simplicity is not shown. The IPSec policy is a set of rules assigned to client 126 that defines how the client uses IPSec and includes filter lists, authentication methods, and other information. In the example, it is assumed that the client IPSec policy requires that all data sent between the client 126 and the server 134 be encrypted using the ESP protocol. The use of IPSec policy is known and need not be described further herein.

The IPSec driver 142 also determines whether a Security Association (SA) exists for the connection between the client 126 and the server 134. The SA is a data structure that describes a transformation to be applied to the data. For example, it defines the encryption algorithm and keys, and protocol mode, e.g. ESP or AH. Two SAs exist for each connection. One SA is for outbound traffic, i.e. from the client to the server, and the other SA is for inbound traffic, i.e. from the server to the client. The inbound traffic SA instructs the IPSec driver how to process incoming IPSec packets. The outbound traffic SA instructs the IPSec driver how to generate outbound IPSec packets.

If an SA does not exist for the connection, the IPSec driver 142 requests that the IKE service 138 of client 126 negotiate an SA with the IKE process 160 of server 134. Each IKE service uses the IKE protocol to conduct the negotiation.

The IKE protocol negotiation has two phases. In a first phase, known as the "main mode," the client 126 and the server 134 establish a secure channel for,conducting the IKE negotiation, referred to as the IKE SA. In the second phase, known as the "quick mode," the client IKE process 138 and server IKE process 160 negotiate general purpose SAs over the secure channel established in the first phase. Once the IKE negotiation is complete, the client 126 sends data to the server 134 using the ESP or AH protocols. In the case of the ESP protocol, the transport layer protocol header is encrypted thereby preventing NAT 130 from changing port addresses. Thus, the client 126 modifies the format of ESP packets so the packets can traverse the NAT 130.

Figure 3:
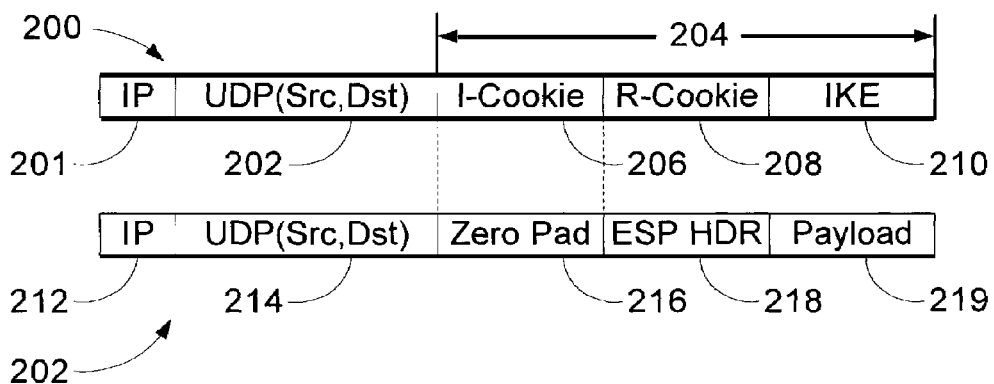
FIG. 3 is a block diagram of network messages used by the present invention.

FIG. 3 illustrates a known format of IP packets using IKE protocol. FIG. 3 also illustrates a modified form of an ESP packet known as a UDP encapsulated ESP packet. The IKE packet 200 includes IP header 201, UDP header 202, and IKE header 204. The IKE header 204 includes an I-Cookie 206 and an R-Cookie 206 as well as other data 210. The I-Cookie and R-Cookie are non-zero numbers assigned by the client 126 (initiating computer) and server 134 (responding computer) respectively. The UDP header 202 in IKE packet 200 is not encrypted. Accordingly, IKE packet 200 can traverse NAT 130 without modification.

The ESP packet 202 includes an IP header 212, an ESP header 218 and an encrypted payload 219, all of which form part of a standard ESP packet. The encrypted payload 219 includes the TCP or UDP header added by stack 156. As previously described, the NAT 130 cannot read and modify the TCP or UDP header within payload 219 because it is encrypted and opaque to the NAT. A UDP header 214 and zero pad 216 are added to the standard ESP packet. The UDP header 214 is a standard unencrypted UDP header that can be read and modified as required by the NAT 130. The zero pad 216 is 8 bytes in length and has a value of zero. The format of ESP packet 202 is supposed to permit the ESP packet to traverse NAT 130.

Both the IKE packet 200 and UDP encapsulated ESP packet 202 use destination ports having a value of 500 in the respective UDP headers 202 and 214. The IKE packet 200 uses port 500 because port 500 is assigned by the Internet Assigned Numbers Authority (IANA) to the IKE processes. The UDP encapsulated ESP packet uses port 500 to ensure that IKE and UDP encapsulated ESP packets are subjected to the same NAT port mapping. The zero pad 216 in the UDP encapsulated ESP packet is aligned with the I-Cookie 206 from the IKE packet 200. As previously described, the I-Cookie is non-zero. Thus, the pad 216 allows a computer receiving the packet to differentiate between an IKE packet and a UDP encapsulated ESP packet. If the 8 bytes following the UDP header is zero, the packet is an ESP packet. If the 8 bytes following the UDP header is non-zero, the packet is an IKE packet.

In a network environment, NAT 130 may be an IPSec-aware NAT. An IPSec-aware NAT anticipates that it will not be able to read and modify an encrypted TCP or UDP header in an ESP packet. These NATs look for IKE traffic over ports reserved for IKE packets, for example port 500. If the NAT receives a packet specifying a destination port of 500, the NAT expects to receive subsequent ESP packets. The NAT then attempts to map a security parameter index (SPI), which is a 4 byte number in an unencrypted portion of the ESP packet, to the client computers.

IPSec aware NATs do not anticipate ESP packets formatted as shown in FIG. 3. The NAT interprets the UDP encapsulated packet 202 as an IKE packet because it has a destination port address of 500. Thus, while the NAT 130 receives the ESP packets, it never interprets them as such and never obtains the SPI from the ESP header 218. The NAT may also read and interpret the zero pad 216 as an I-Cookie value. Since the zero pad 216 has a value of zero and the I-Cookie value is not supposed to be zero, the NAT may drop the packet as invalid.

The invention uses the previously described IKE protocol main mode negotiation to implement a port float algorithm that permits UDP encapsulated ESP traffic to traverse a NAT regardless of whether the NAT is IPSec aware. The invention uses the IKE negotiation process to perform three phases. In a first phase, the client and server determine whether both are capable of sending UDP encapsulated ESP packets. In a second phase, the client and server conduct NAT discovery and determine whether the client, server, or both operate behind a NAT. In a third phase, the client and server initiate a port float algorithm, moving at least the destination UDP port, i.e. the UDP port address for server 134, from port 500 to some other distinct port. The server 134 maintains an additional data structure 190. The data structure 190 allows the server to determine which client 126, 128 transmitted data after the client 126 exits the second phase and enters the third phase.

Figure 4:
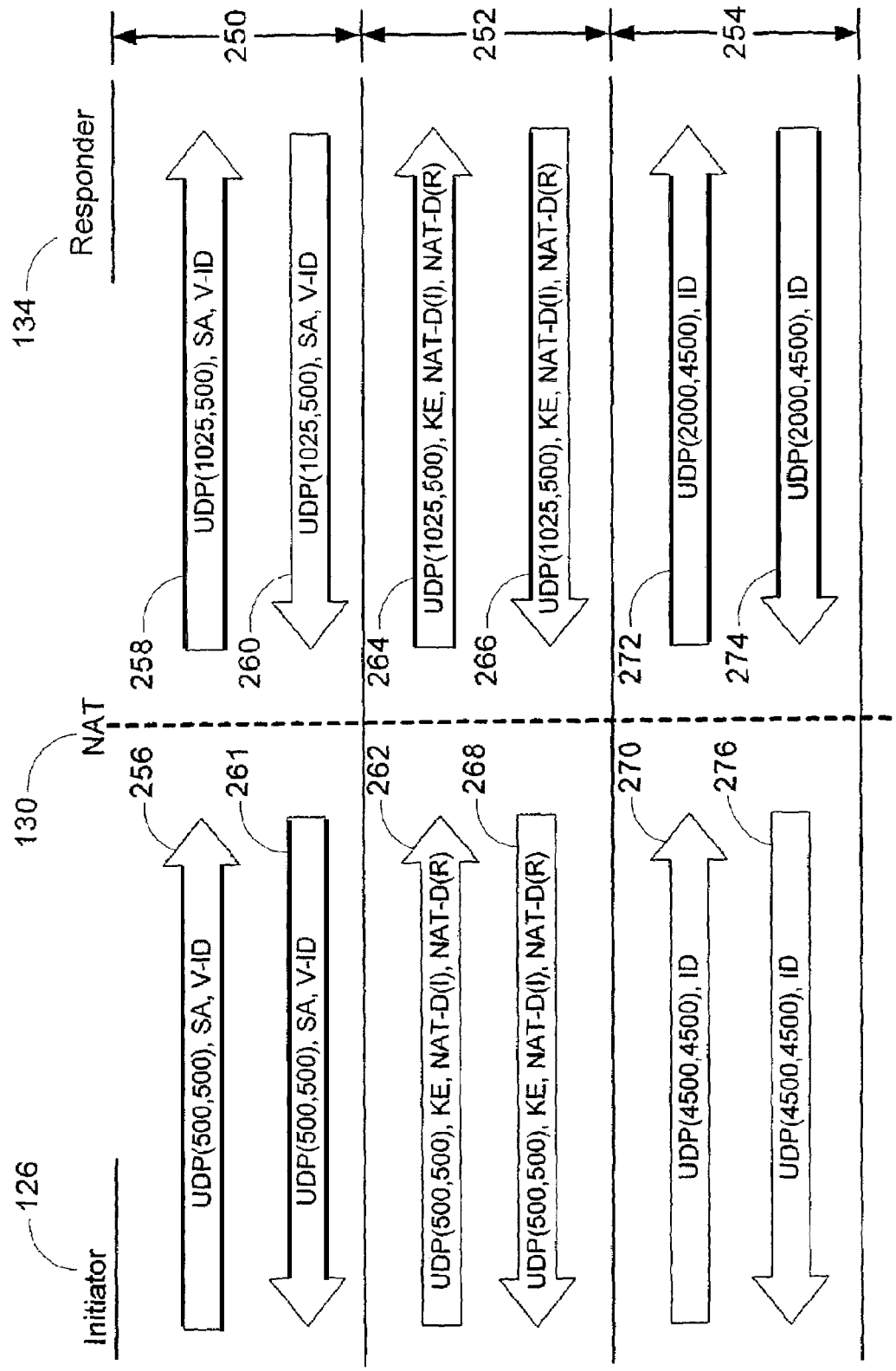
FIG. 4 is an exemplary negotiation between a client and a server illustrating the present invention.

FIG. 4 illustrates packets exchanged between client 126 and server 134 during an IKE negotiation according to the invention. The client 126 is referred to as the initiator and the server 134 is referred to as the responder. The packets are shown in simplified form and only the pertinent data within each packet is illustrated. For example, the source and destination IP addresses are not shown. Each message is shown before and after NAT traversal. It will be understood that the NAT 130 modifies source IP addresses in the manner previously described. The IKE main mode negotiation includes three phases labeled 250, 252, 254.

In the first phase 250, the initiator 126 and responder 134 conduct a NAT traversal detection sequence. The initiator 126 sends an IKE packet 256 to the responder 134. The contents of IKE packet 256, shown in simplified form, are sent over UDP source and destination ports 500. The IKE packet 256 also includes an SA payload proposing one or more security associations based on the protocols and transforms designated by the initiator's IPSec policy. For example, the initiator 126 proposes using either DES or 3DES encryption with the ESP protocol. The packet 256 further includes a Vendor ID (V-ID) that indicates that initiator 126 is capable of NAT traversal, i.e capable of sending UDP encapsulated ESP packets. Any appropriate distinct value is used for the Vendor ID to identify a computer that is capable of NAT traversal. One such known value is an MD5 hash of the string "draft-ietf-ipsec-nat-t-ike-00."

As shown by packet 258, the IKE packet traverses NAT 130 and the NAT 130 changes the source port in the UDP header from 500 to 1025. The responder 134 receives the IKE packet 258 and issues a response IKE packet 260. The response IKE packet 260 includes an SA payload. According to the IPSec protocol, the SA payload in packet 260 only includes a single proposed SA, for example DES encryption using the ESP protocol. The response IKE packet 260 also includes the V-ID indicating that the responder 134 is capable of NAT traversal. The NAT 130 receives the response IKE packet and based on its internal mapping 151 changes the port address of initiator 126 from 1025 back to 500 and sends the modified packet 261 to the initiator 126. The first phase 250 permits the responder 134 to determine that initiator 126 is capable of NAT traversal and for initiator 126 to determine that responder 134 is capable of NAT traversal based upon the Vendor IDs embedded in the IKE packets.

The second phase 252 provides a NAT discovery process that allows the initiator 126 and the responder 134 to determine whether at least one of the initiator or responder operate behind the NAT 130. The initiator 126 sends a second IKE packet 262 to the responder 134 again over source and destination UDP ports of 500. The second IKE packet 262 includes a KE payload with a Diffie-Hellman public key value. The transmission of KE payloads and Diffie-Hellman pubic key values is known and need not be described further herein. The second IKE packet 262 also includes two NAT discovery payloads, NAT-D(I) and NAT-D(R).

The NAT-D(I) payload is hash function of at least the initiator IP and port addresses as known to the initiator 126, i.e. source port and IP addresses that the initiator uses to transmit IKE packets. In the example, the initiator knows its IP address is private IP address 10.10.10.1 and its source port address is 500.

The NAT-D(R) is a hash of at least the responder IP and port address as known to initiator 126, i.e. the responder IP and port addresses included in the IKE packets received by the initiator 126. In the example, the initiator 126 receives IKE packets with the responder IP address of 200.200.200.1 and the responder port address of 500.

It will be understood by those skilled in the art that the hash function used to arrive at the NAT-D(I) and NAT-D(R) may be a function of additional values such as the I-Cookie and R-Cookie values. Any such additional values may be used provided they are known to both the initiator 126 and responder 134.

The NAT 130 receives the IKE packet 262 with the NAT-D payloads and modifies the source port address to 1025 according to its mapping table. The NAT 130 then transmits the modified packet 264 to the responder 134. After the responder 134 receives the second IKE packet 264, it computes NAT-D(I) and NAT-D(R) values based on source and destination IP and port address as known to the responder 134. In this case, the responder 134 knows its IP address as 200.200.200.1 and its port address as 500 because these are the responder IP and port addresses that the responder uses when sending IKE packets. Likewise, the responder 134 knows the initiator's IP address is 100.100.100.1 and port address is 1025 because these are the initiator address values in the IKE packets after NAT traversal and as received by the responder. After calculating its own NAT-D values, the responder 134 sends a response packet 266 with its calculated NAT-D(I) and NAT-D(R) payloads to initiator 126.

The responder 134 compares its calculated NAT-D(I) with the NAT-D(I) provided by the initiator 126. These value are different because the responder calculated the NATD(I) using an initiator IP address of 100.100.100.1 and a port address of 1025. The initiator calculated the NAT-D(I) using an initiator IP address of 10.10.10.1 and a port address of 500. As a result, the responder 134 determines that the initiator is behind a NAT, i.e. packets send from initiator 126 are modified by a NAT. The responder 134 also compares the NAT-D(R) received from initiator 126 with its calculated NAT-D(R) value. In this case, the two NAT-D values match since both the initiator 126 and responder 134 use a responder IP address of 100.100.100.1 and port address of 500. Thus, the responder determines that it is not behind a NAT.

The initiator 134 receives the second response message from responder 134, labeled 268 following NAT traversal. The initiator also compares its calculated NATD(I) and NAT-D(R) values with those provided by the responder 134. Initiator 126 likewise determines based on the comparison that it is operating behind a NAT while the responder 134 is not.

If neither the initiator 126 nor responder 134 send IP packets that are modified by NAT 130, the third phase 252 of the invention need not be implemented as standard IPSec messages may be sent. If one or both of the initiator and responder send IP packets that are modified by a NAT, and both the initiator and responder are capable of NAT traversal, the third phase 254 is implemented.

In the third phase 254, the initiator 126 and responder 134 enter an IKE port float phase 254. The initiator 126 sends the next IKE packet 270 during the main mode exchange over a new set of source and destination UDP ports. In the example shown, the new set of source and destination ports selected are port 4500. The NAT receives the IKE packet but does not necessarily translate the source port to 1025. The NAT instead translates the source port to some other value. In the example, the NAT translates the source port to 2000 as shown by IKE packet 272. The NAT creates a new entry in mapping 151 identifying the new port translation.

The responder 134 receives IKE packet 272 from the NAT 130 but cannot determine the source based solely on the IP and port addresses. The responder 134 anticipates that the initiator will float the source and destination UDP port address in the IKE packet to 4500 but cannot anticipate what value the NAT will translate the source UDP address to, in this case 2000. Accordingly, the responder 134 maintains a mapping 190 including the I-cookie, R-cookie, initiator IP address and responder IP address. As shown in the IKE packet formats of FIGS. 3, these values are provided to the responder 134 in each IKE packet. Thus, the mapping entry is created when the responder receives packet 258 in the first phase. When the responder receives the IKE packet with destination port 4500 in the third phase, it reads the IP addresses and the I-Cookie and R-Cookie values from the IKE packet (FIG. 3). The responder 134 then compares the information from the IKE packet with the mapping 190 to identify the proper client.

The responder 134 then completes the main mode IKE negotiation by sending response IKE packet 274 identifying responder port 4500 and initiator port 2000. The NAT 130 changes the initiator port back to 4500 and forwards the packet to the initiator as shown by packet 276.

If the responder 134 needs to retransmit an IKE packet, the responder retransmits the IKE packet over the same UDP ports of the original message. For example, if responder 134 needs to retransmit packet 266, it retransmits the IKE packet using source and destination UDP ports of 1025 and 500 respectively, even though following the second phase 252 the responder 136 is waiting for the initiator 126 to float to destination port 4500.

Following the above exchange, the initiator 126 and the responder 134 communicate as before except for the use of the new port addresses. This includes not only packets exchanged during the quick mode IKE negotiation but also for subsequent ESP packets. Thus, when sending IKE quick mode and ESP packets, the initiator 126 sends packets designating source and destination UDP ports of 4500. Because the ESP traffic is now sent to a destination port other than 500, IPSec aware NATs will not interpret ESP packets as IKE packets.

According to the IPSec protocol, an IKE quick mode or main mode exchange is used to rekey, i.e. refresh cryptographic keys used as part of the ESP protocol. Either the initiator or responder can request the rekey. If a rekey is requested by the responder during quick mode, it must be done using IKE packets using the new ports. If a new main mode exchange is initiated by the responder, the responder likewise uses the new ports when sending the first IKE packet. Thus, in the example shown in FIG. 5, the responder sends the IKE quick mode or main mode packet over initiator and responder ports of 2000 and 4500, respectively. This is necessary because the original NAT mapping over port 500 may time out and any request over port 500 from the responder to the initiator may not reach the initiator.

In an embodiment of the invention, the IKE negotiation is initiated over a port address that the NAT 130 does not recognize as an IKE port. For example, instead of starting the negotiation over port 500 and then later switching to port 4500, the initiator designates port 4500 during the first IKE exchange. Thus, there is no need to implement the IKE port float algorithm.

Figure 5:
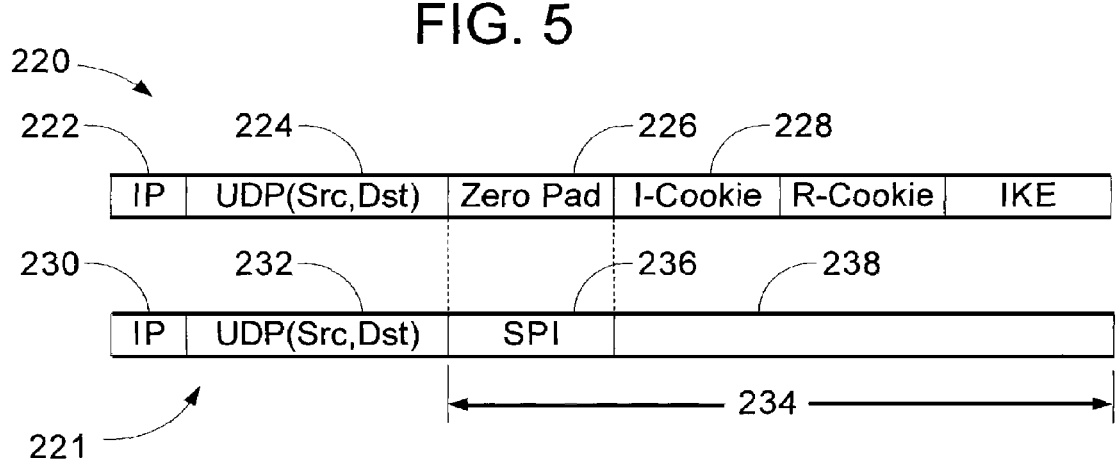
FIG. 5 is a block diagram of network messages used by the present invention.

FIG. 5 illustrates improved IKE and UDP encapsulated ESP packet formats that may be implemented as an alternative to the formats shown in FIG. 3. Like IKE packet 200, IKE packet 220 includes IP header 222 and UDP header 224. In contrast to IKE packet 200, IKE packet 220 includes a 4-byte pad 226 with a known value inserted between the UDP header 224 and I-Cookie 228. The known value may be any suitable selected value, such as zero, used to differentiate an IKE packet from a UDP encapsulated ESP packet.

ESP packet 221 includes IP header 230 and UDP header 232. Unlike ESP packet 202, ESP packet 221 does not include a zero pad. The UDP header 232 is simply followed by ESP header 234. The ESP header includes SPI 236 and other data 238 such as the remaining ESP header and payload data. As shown in FIG. 5, the SPI in the ESP header 234 of ESP packet 221 aligns with the pad 226 of IKE packet 220. A network device, such as client 128 or server 134 differentiates between IKE and ESP packets by reading the 4 bytes following the UDP header. If the value is the known value, the packet is an IKE packet. If the pad 226 has any other, the packet is an ESP packet.

The packet format shown in FIG. 5 is more efficient than the format shown in 3. Typically, more ESP packets are sent than IKE packets, since IKE packets are only sent during IKE negotiations while ESP packets are sent to exchange potentially large amounts of information between client 126 and server 134. Removing the additional zero pad from ESP packets provides a more efficient method to transmit data between the client 126 and the server 134.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A method for sending user datagram protocol encapsulating encapsulating security protocol packets through a network address translation device on a private network from a client on the private network to a server on a public network, using a key management and exchange protocol negotiation, comprising:

determining whether both the client and server are capable of sending the user datagram protocol encapsulated encapsulating security protocol packets, wherein the client sends a first key management and exchange protocol packet to the server and receives a second key management and exchange protocol packet from the server, the first and second key management and exchange protocol packet send over first source and destination user datagram protocol port;

creating an entry in a data structure that uniquely identifies a connection between the client and the server exchanging key management and exchange protocol packets sent over the first source and destination user datagram protocol ports, the entry including at least an internet protocol address of the client and an internet protocol address of the server;

determining whether at least one of the client or the server operate behind the network address translation device; and if it is determined that at least one of the client or the server operate behind the network address translation device;

selecting second source and destination ports, the second source and destination ports being distinct from the first source and destination ports; and sending the user datagram protocol encapsulated encapsulating security protocol packets over the second source and destination ports so that the user datagram protocol encapsulated encapsulating security protocol packets are able to traverse the network address translation device, wherein the server identifies the client using the data structure;

wherein the network address translation device interprets the user datagram protocol encapsulated encapsulating security protocol packets designating the first destination port as key management and exchange protocol packets and user datagram protocol encapsulated encapsulating security protocol packets designating the second destination port as non-key management and exchange protocol packets.

2. The method of claim 1, wherein the network address translation device interprets the user datagram protocol encapsulated encapsulating security protocol packets designating the first destination port as invalid and user datagram protocol encapsulated encapsulating security protocol packets designating the second destination port as valid.

3. The method of claim 1, wherein the first and second key management and exchange protocol packets each include a vendor ID; the vendor ID being a known value indicating a capability of sending user datagram protocol encapsulated encapsulating security protocol packets.

4. The method of claim 1, wherein the step of determining whether at least one of the client or the server operate behind the network address translation device further comprises:

sending a third key management and exchange protocol packet including a first and second network address translation device discovery payload, the first network address translation device T discovery payload including a hash function of the first source port address and a source internet protocol address as known to the client and the second network address translation device discovery payload including a hash function of the first destination port address and a destination internet protocol address as known to the client;

receiving a fourth key management and exchange protocol packet including a third and a fourth network address translation device discovery payload, the third network address translation device discovery payload including a hash function of the first source port address and a source internet protocol address as known to the server and the fourth network address translation device discovery payload including a hash function of the first destination port address and a destination internet protocol address as known to the server; and determining based on a comparison of the first and third network address translation device discovery payloads that the client operates behind the network address translation device.

5. The method of claim 4 further comprising: determining based on a comparison of the second and fourth network address translation device discovery payloads that the server does not operate behind the network address translation device.

6. The method of claim 1, wherein the key management and exchange protocol negotiation is a main mode negotiation.

7. The method of claim 1 wherein the mapping data structure further comprises an I-Cookie value assigned by the client and an R-Cookie value assigned by the server.

8. The method of claim 1, further comprising sending a request for a new cryptographic key in third key management and exchange protocol packet using the second source and destination ports.

9. A method for receiving user datagram protocol encapsulated encapsulating security protocol packets at a server on a public network, the user datagram protocol encapsulated encapsulating security protocol packets being sent from a client operating behind a network address translation device on a private network, comprising:

receiving a first key management and exchange protocol packet and sending a second key management and exchange protocol packet, the first and second key management and exchange protocol packets designating a first destination port and including a vendor identification value indicating a capability to send the user datagram protocol encapsulated encapsulating security protocol packets;

storing a value identifying a connection between the client and the server exchanging key management and exchange protocol packets designating the first destination port;

determining that at least the client operates behind the network address translation device; and if it is determined that at least the client operates behind the network address translation device:

selecting a second destination port, the second destination port being distinct from the first destination port;

receiving a third key management and exchange protocol packet designating the second destination port;

determining that the third key management and exchange protocol packet is sent by the client by comparing a unique identification within the third key management and exchange protocol packet to the stored value; and receiving the user datagram protocol encapsulated encapsulating security protocol packets sent over the second destination port, the user datagram protocol encapsulated encapsulating security protocol packets designating the second destination port, so that the user datagram protocol encapsulated encapsulating security protocol packets are able to traverse the network address translation device.

10. The method of claim 9, wherein the step of determining that at least the client operates behind a network address translation device comprises:

receiving a discovery payload from the client, the discovery payload including a first value derived from a hash function of a client IP and port address as known to the client; calculating a second value from a hash function of the client IP and port address as known to the server; and comparing the first value to the second value and determining that the client operates behind the network address translation device.

11. The method of claim 10, wherein the first value is distinct from the second value.

12. The method of claim 9, wherein the stored valued comprises an I-Cookie value assigned by the client, an R-Cookie value assigned by the server, an internet protocol address of the client and an internet protocol address of the server.

13. Computer storage media having computer executable instructions for sending user datagram protocol encapsulated encapsulating security protocol packets through a network address translation device on a private network from a client on the private network to a server on a public network, using a key management and exchange protocol negotiation, comprising:

determining whether both the client and server are capable of sending the user datagram protocol encapsulated encapsulating security protocol packets, wherein the client sends a first key management and exchange protocol packet to the server and receives a second key management and exchange protocol packet from the server, the first and second key management and exchange protocol packets sent over first source and destination user datagram protocol ports;

creating an entry in a data structure that uniquely identifies a connection between the client and the server exchanging key management and exchange protocol packets sent over the first source and destination user datagram protocol ports, the entry including at least an internet protocol address of the client and an internet protocol address of the server;

determining whether at least one of the client or the server operate behind the network address translation device; and if it is determined that at least one of the client or the server operate behind the network address translation device:

selecting second source and destination ports, the second source and destination ports being distinct from the first source and destination ports; and sending the user datagram protocol encapsulating security protocol packets over the second source and destination ports so that the user datagram protocol encapsulated encapsulating security protocol packets are able to traverse the network address translation device, wherein the server identifies the client using the data structure.

14. The computer storage media of claim 13, wherein the first and second key management and exchange protocol packets each include a vendor ID; the vendor ID being a known value indicating a capability of sending user datagram protocol encapsulated encapsulating security protocol packets.

15. The computer storage media of claim 13, wherein determining whether at least one of the client or the server operate behind the network address translation device comprises:

sending a third key management and exchange protocol packet including a first and second network address translation device discovery payload, the first network address translation device discovery payload including a hash function of the first source port address and a source internet protocol address as known to the client and the second network address translation device discovery payload including a hash function of the first destination port address and a destination internet protocol address as known to the client;

receiving a fourth key management and exchange protocol packet including a third and a fourth network address translation device discovery payload, the third network address translation device discovery payload including a hash function of the first source port address and a source internet protocol address as known to the server and the fourth network address translation device discovery payload including a hash function of the first destination port address and a destination internet protocol address as known to the server; and determining based on a comparison of the first and third network address translation device discovery payloads that the client operates behind the network address translation device.

16. The computer storage media of claim 13 wherein the data structure further comprises an I-Cookie value assigned by the client and an R-Cookie value assigned by the server.

17. The computer storage media of claim 13 further comprising sending a request for a new cryptographic key in a third key management and exchange protocol packet using the second source and destination port addresses.

18. Computer storage media having computer executable instructions for receiving user datagram protocol encapsulated encapsulating security protocol packets at a server on a public network, the user datagram protocol encapsulated encapsulating security protocol packets being sent from a client operating behind a network address translation device on a private network, comprising:

receiving a first key management and exchange protocol packet and sending a second key management and exchange protocol packet, the first and second key management and exchange protocol packets designating a first destination port and including a vendor identification value indicating a capability to send the user datagram protocol encapsulated encapsulating security protocol packets;

storing a value identifying a connection between the client and the server exchanging key management and exchange protocol packets designating the first destination port;

determining that at least the client operates behind the network address translation device; and if it is determined that at least the client operates behind the network address translation device;

selecting a second destination port, the second destination port being distinct from the first destination port;

receiving a third key management and exchange protocol packet designating the second destination port;

determining that the third key management and exchange protocol packet is sent by the client by comparing a unique identification within the third key management and exchange protocol packet to the stored value; and receiving user datagram protocol encapsulated encapsulating security protocol packets sent over the second destination port, the user datagram protocol encapsulated encapsulating security protocol packets designating the second destination port, so that the user datagram protocol encapsulated encapsulating security protocol packets are able to traverse the network address translation device.

19. The computer storage media of claim 18, wherein the step of determining that at least the client operates behind a network address translation device comprises:

receiving a discovery payload from the client, the discovery payload including a first value derived from a hash function of a client IP and port address as known to the client;

deriving a second value from a hash function of the client IP and port address as known to the server;

comparing the first value to the second value and determining that the client operates behind the network address translation device.

20. The computer storage media of claim 19, wherein the stored valued comprises an I-Cookie value assigned by the client, an R-Cookie value assigned by the server, an internet protocol address of the client and an internet protocol address of the server.

* * * * *